US012528217B2

(12) United States Patent
Yaguchi

(10) Patent No.: US 12,528,217 B2
(45) Date of Patent: Jan. 20, 2026

(54) CUTTER TOOL

(71) Applicant: Taro Yaguchi, Tokyo (JP)

(72) Inventor: Taro Yaguchi, Tokyo (JP)

( * ) Notice: Subject to any disclaimer, the term of this patent is extended or adjusted under 35 U.S.C. 154(b) by 355 days.

(21) Appl. No.: 18/264,759

(22) PCT Filed: Feb. 14, 2022

(86) PCT No.: PCT/JP2022/005567
§ 371 (c)(1),
(2) Date: Feb. 20, 2024

(87) PCT Pub. No.: WO2022/173031
PCT Pub. Date: Aug. 18, 2022

(65) Prior Publication Data
US 2024/0227216 A1 Jul. 11, 2024

Related U.S. Application Data
(60) Provisional application No. 63/149,133, filed on Feb. 12, 2021.

(51) Int. Cl.
*B26B 29/02* (2006.01)
*B26B 3/00* (2006.01)
*B43M 7/00* (2006.01)

(52) U.S. Cl.
CPC ................ *B26B 29/02* (2013.01); *B26B 3/00* (2013.01); *B43M 7/002* (2013.01); *B43M 7/007* (2013.01)

(58) Field of Classification Search
CPC .......... B26B 3/00; B26B 3/08; B26B 27/005; B26B 29/00; B26B 29/02; B43M 7/002; B43M 7/007; B43M 7/00
USPC ..... 30/153, 2, 314, 317, 278, 280, 286, 289, 30/294, 295
See application file for complete search history.

(56) References Cited

U.S. PATENT DOCUMENTS 2,247,290 A * 6/1941 Disbrow ............... B26B 27/005 30/2
2,298,024 A * 10/1942 Vallarelli ............... B43M 7/002 30/294
3,201,868 A * 8/1965 Solly ....................... B26B 5/006 30/2
(Continued)

FOREIGN PATENT DOCUMENTS

JP H04102974 U 9/1992
JP H0560473 U 8/1993
(Continued)

OTHER PUBLICATIONS

English Translation of International Preliminary Report on Patentability Chapter II.

*Primary Examiner* — Phong H Nguyen
(74) *Attorney, Agent, or Firm* — Taro Yaguchi

(57) ABSTRACT

A paper cutter comprises a main body (1) defined by a guide surface (3) formed for guiding a top crease line of paper; a cutter (6) attached to the main body, wherein a part of the cutter (6) protrudes from the guide surface (3); and a pair of cover pieces attached to the main body (1) so that the cover pieces sandwich and hide the guide surface (3) and the cutter (6), wherein at least one of the cover pieces opens and closes in a direction away from the cutter 6 and a direction towards the cutter 6 along a line parallel to the guide surface (3).

11 Claims, 7 Drawing Sheets

(56) References Cited

U.S. PATENT DOCUMENTS

| | | | | | |
|---|---|---|---|---|---|
| 4,106,196 | A | * | 8/1978 | Smithline ............... | B26B 27/00<br>30/294 |
| 5,007,171 | A | * | 4/1991 | Horning, Jr. .............. | B67B 7/30<br>30/294 |
| 5,285,575 | A | | 2/1994 | Hirano | |
| 5,333,381 | A | * | 8/1994 | Gelardi ................... | B26B 29/06<br>30/294 |
| 5,555,624 | A | * | 9/1996 | McCracken ............ | B26B 27/00<br>30/294 |

FOREIGN PATENT DOCUMENTS

| | | | |
|---|---|---|---|
| JP | 3428982 | B1 | 7/2003 |
| JP | 2004-49247 | A | 2/2004 |
| JP | 2018-117863 | A | 8/2018 |

* cited by examiner

CUTTER TOOL

FIELD OF THE INVENTION

The present invention relates to a safe cutter tool, particularly a paper cutter for cutting a letter, an envelope, wrapping paper, or the like along a predetermined crease.

BACKGROUND OF THE INVENTION

Conventionally, there are products called paper openers for opening an envelope.

These paper openers have a sharp tip part to be inserted into a back side of a paper section desired to be severed, and then to be moved along a line to be cut to thereby allow severing of the paper along the predetermined line.

However, paper-severing cutter parts of these products are exposed and could pose a risk that a user might accidentally touch the cutter depending on how those products were used.

SUMMARY OF THE INVENTION

Considering the above situation, the purpose of the present invention is to provide a safer cutter tool.

In order to achieve the aforementioned object, according to a principal aspect of the present invention, the following invention is provided.

(1) A cutter tool, comprising:

a main body defined by a guide surface formed on one end;

a cutter attached to the main body, wherein a part of the cutter protrudes from the guide surface; and a pair of cover pieces attached to the main body so that the cover pieces sandwich and hide the guide surface and the cutter, wherein at least one of the cover pieces moves in a direction to close and a direction to open with respect to the cutter with the guide surface as a fulcrum, and exposes the tip part of the cutter by moving in a direction to open.

(2) The cutter tool of (1), wherein a hinge part is provided between the cover pieces and the main body for enabling open and close operations of the cover pieces.

(3) The cutter tool of (2), wherein the hinge part is configured to bias the cover piece in its closing direction.

(4) The cutter tool of (2), wherein the cover pieces and the main body are structured as one integral part, and the hinges is formed by providing a slit on a boundary line between the cover piece and the main body.

(5) The cutter tool of (4), wherein the slit is provided in parallel with the guide surface.

(6) The cutter tool of (1), wherein the main body is configured of two or more parts separable in a direction of sandwiching the cutter, and the two or more parts are joined together with the base end part of the cutter sandwiched there-in-between to thereby retain the base end part of the cutter protruding from the guide surface.

(7) The cutter tool of (1), wherein the guide surface of the main body is for guiding a top crease line of paper.

(8) The cutter tool of (1), wherein an open angle of the cover pieces is restricted to be 90 degrees or less from the cutter as a reference.

(9) The cutter tool of (1), wherein an open angle of the cover pieces is restricted to be 60 degrees or less from the cutter as a reference.

(10) The cutter tool of (1), wherein an open angle of the cover pieces is restricted to be 45 degrees or less from the cutter as a reference.

(11) The cutter tool of (1), wherein the pair of cover pieces comprise a fastener means for detachably attaching the cover pieces together to keep them in their closing state and prevent them from opening.

Note that characteristics other than those described above are disclosed in the following description on an embodiment and accompanying drawings.

DETAILED DESCRIPTION OF THE INVENTION

One embodiment of the present invention will be described below in detail with reference to accompanying drawings.

Figure 1:
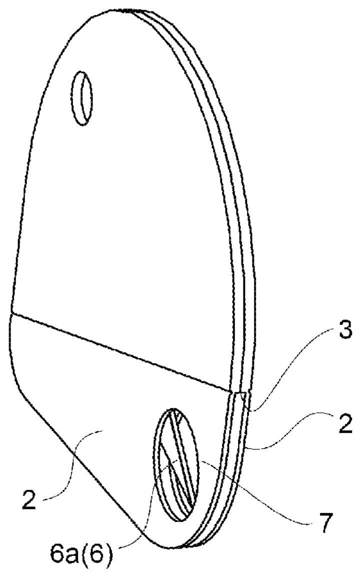
FIG. 1 is a perspective view showing a paper cutter according to one embodiment of the present invention.

FIG. 1 is an overall configuration diagram showing a paper cutter as a cutter tool of the present invention.

(Configuration)

Indicated with 1 in FIG. 1 is a main body. This main body 1 is a plate-like member having, for example, one surface and the other surface having a thickness of, for example, about 2-3 mm. This main body 1 is provided with a pair of cover pieces 2, 2, which have the same outer surfaces as this main body 1, formed integrally with this main body 1, and open outwardly relative to this main body 1.

On a part corresponding to joints between the main body 1 and the cover pieces 2, 2, a linear guide surface 3 is formed between the pair of cover pieces 2, 2 for guiding a sheet of paper to be severed along one direction (an arrow).

Figure 2:
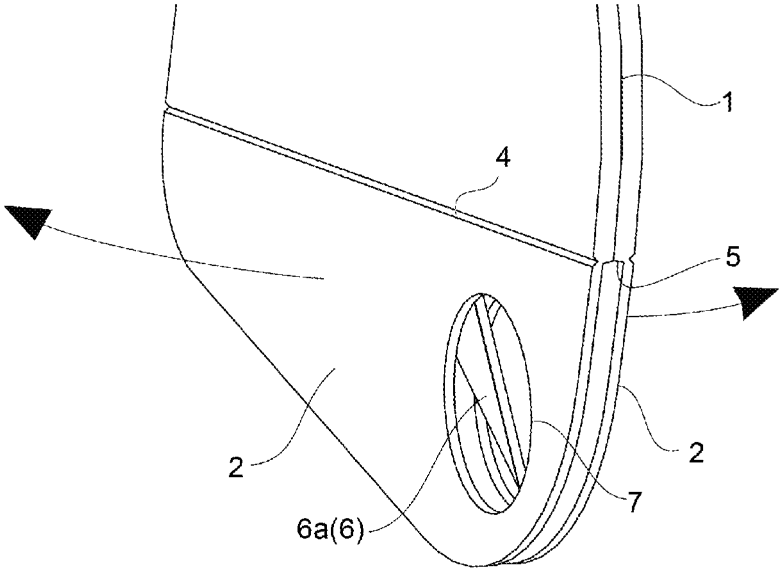
FIG. 2 is another perspective view of the paper cutter according to the one embodiment.

Slits 4 are provided in parallel to the linear guide surface 3 on outer surfaces of the joints between the main body 1 and the cover pieces 2, 2, respectively, as shown in FIG. 2, wherein parts where these slits 4 are provided serve as hinges, enabling the cover pieces 2, 2 to open or close relative to the main body as indicated with arrows in the figure.

Figure 4:
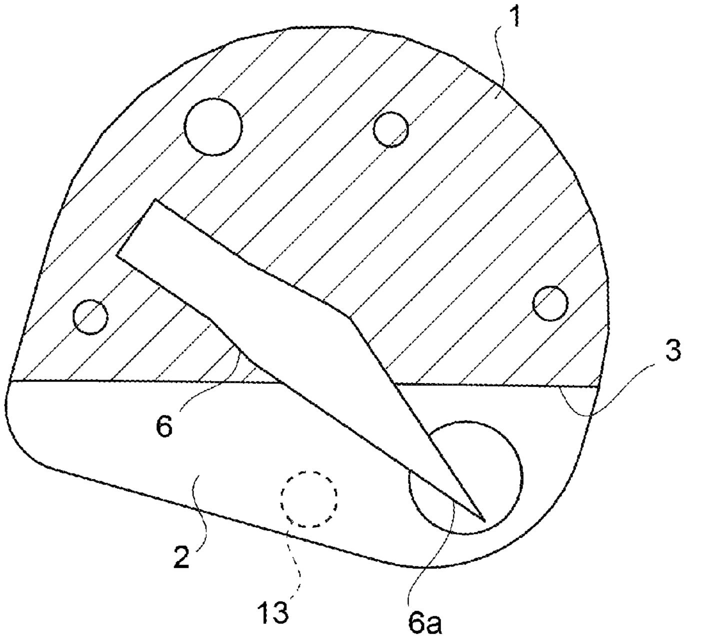
FIG. 4 is a plan view of an inside the paper cutter according to the one embodiment.

Also, the main body 1 is, as shown in FIG. 4, configured as divided into two parts (FIG. 4 shows one of them) with a cutter 6 provided there-in-between (in this embodiment, a design knife blade with 40 mm length), wherein the cutter 6 is provided so that a base end part of the cutter 6 is held in an attachment groove of the main body, and a tip part 6*a* of the cutter 6 projects from the guide surface 3 towards between the cover pieces 2, 2. Here, the projection of the tip part 6*a* of the cutter 6 is configured so that the tip part 6*a* does not protrude beyond the cover pieces 2, 2 when they are closed.

Additionally, each of the cover pieces 2, 2 has a see-through hole formed therein for verifying the tip part 6*a* of the cutter 6 from outside the cover pieces 2, 2. Diameters formed in these see-through holes 7 are, for example, 10 mm or less so as to prevent a finger of a user from inserted in the see-through holes.

Figure 3:
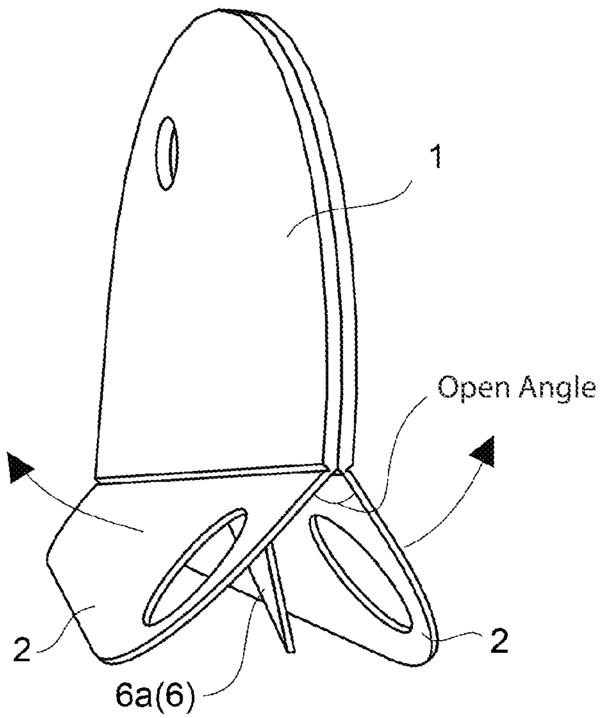
FIG. 3 is a perspective view showing the paper cutter in use according to the one embodiment.

In other words, when these cover pieces 2, 2 are closed, the tip part 6*a* of the cutter 6 is completely hidden; and, as shown in FIG. 3, the tip part 6*a* may be visually exposed by opening the cover pieces 2, 2.

Note that, in this embodiment example, by adjusting the width and depth of the slits 4, an open angle of the cover pieces 2, 2 (FIG. 6) is restricted to be 180 degrees or less, 120 degrees or less, 90 degrees or less, 60 degrees or less, or 30 degrees or less. Moreover, by adjusting the depth and the like of the slits 4, the cover pieces 2, 2 are biased in the direction of closing.

Figure 5:
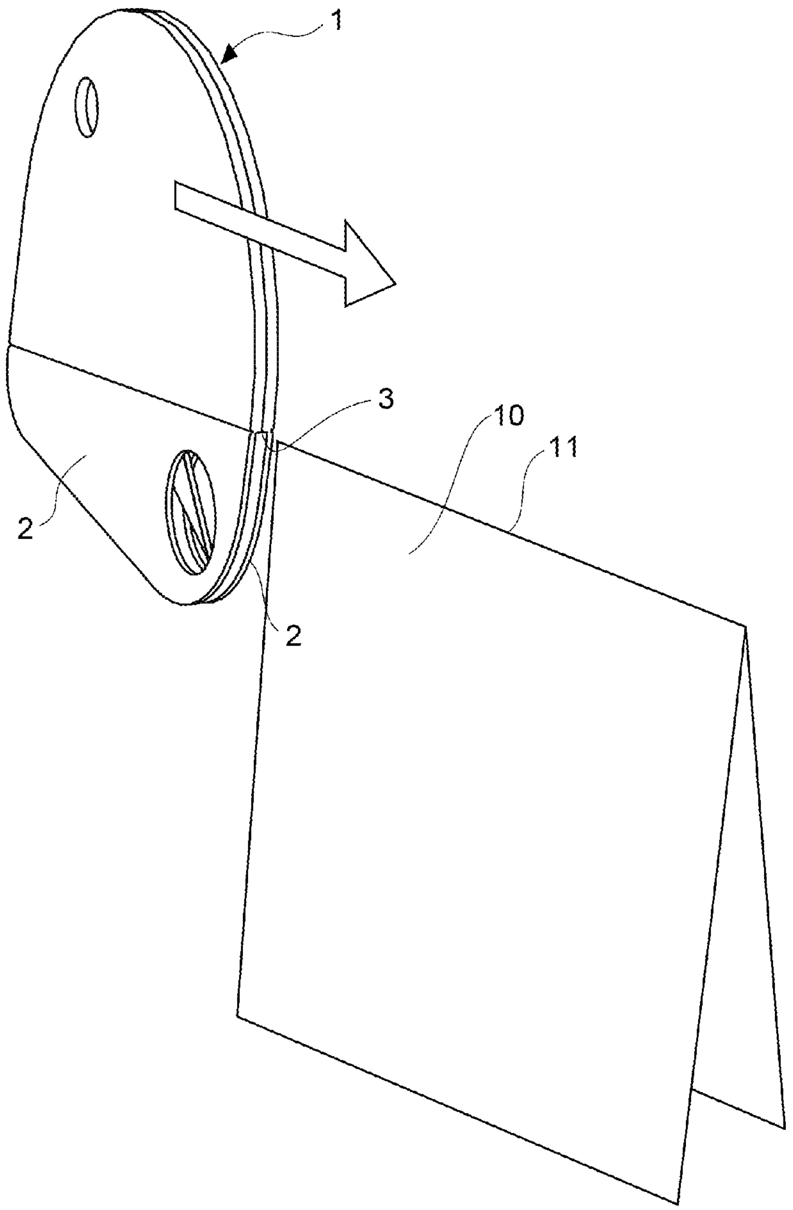
FIG. 5 is a schematic view showing a positional relationship between paper and the paper cutter according to the one embodiment of the present invention.

(Method of Use) As shown in FIG. 5, the main body 1 and paper 10 are positioned. Here, the paper 10 is folded in two by a desired line to be cut 11, that is, a cutting line (crease). Then, a side of the paper to start cutting and the guide surface 5 are aligned to oppose each other.

Figure 6:
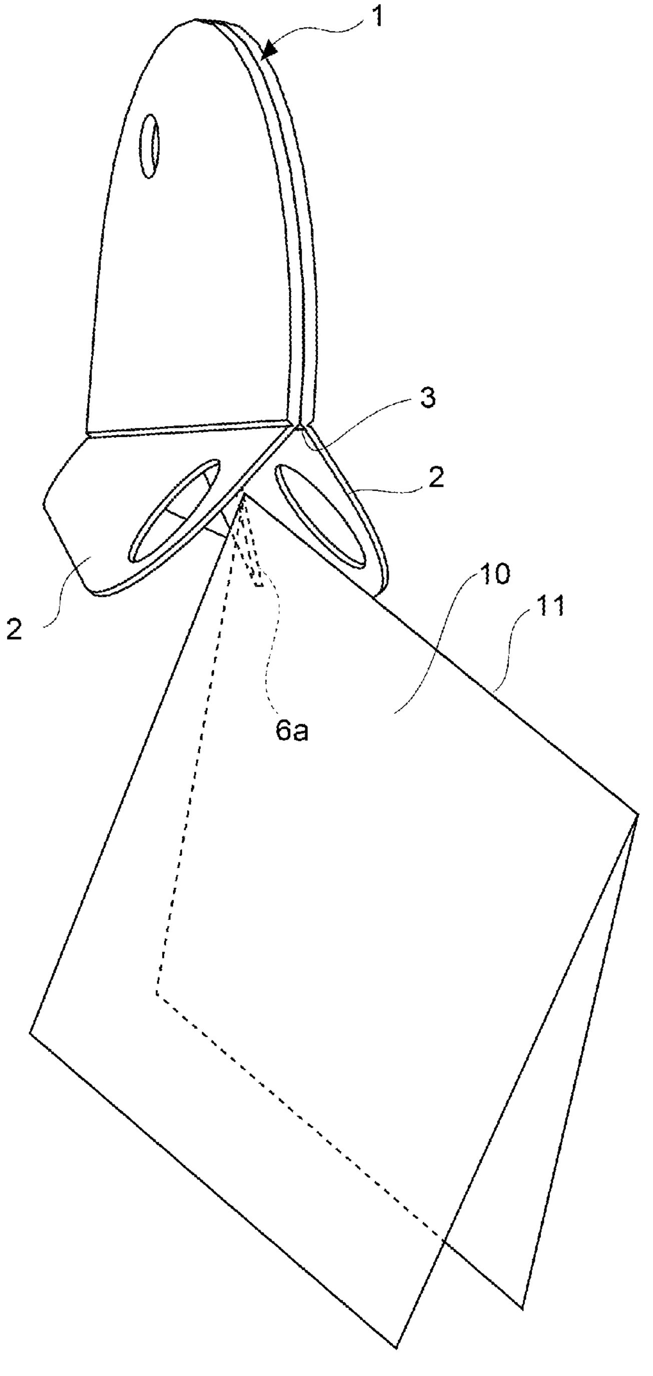
FIG. 6 is a schematic view showing a cutting process according to the one embodiment.

Next, as shown in FIG. 6, the cover pieces 2, 2 are opened to some extent (e.g., to about 60 degrees), the crease 11 and the cutter tip 6*a* are opposed to each other, and the cutter tip 6*a* is inserted into the space inside the crease 11 of the paper 11.

Figure 7:
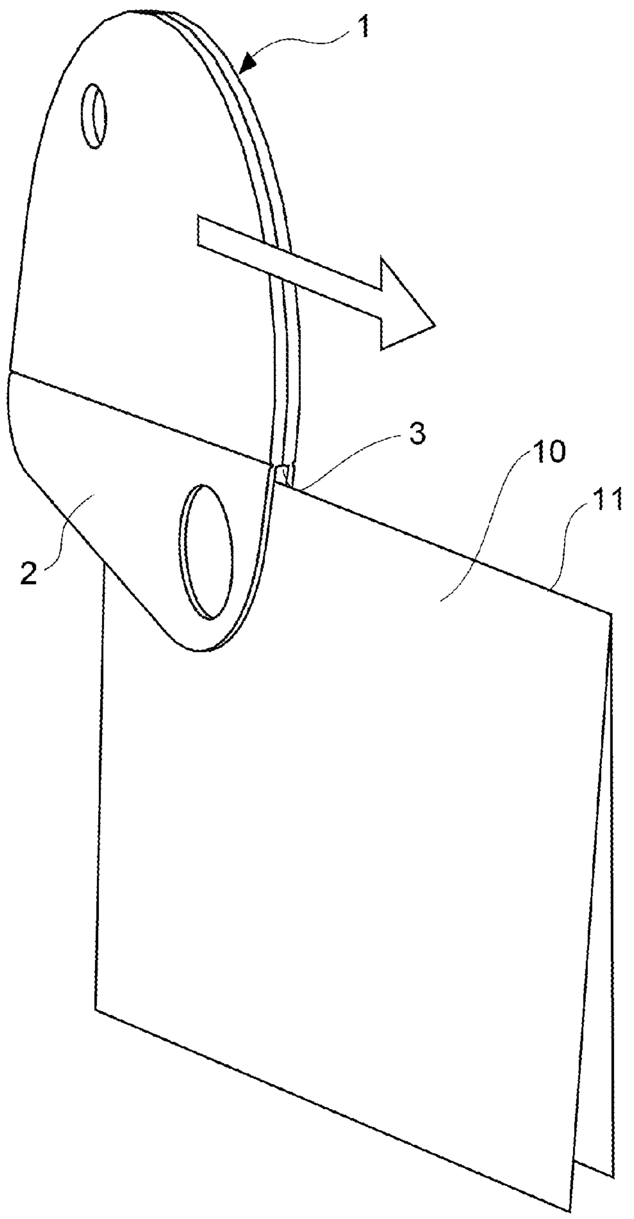
FIG. 7 is another schematic view showing the cutting process according to the one embodiment.

Upon the successful insertion of the cutter tip 6*a*, as shown in FIG. 7, the folding of the paper 10 is returned to its original angle, and the cutting line 11 and the guide surface 5 are aligned again.

Figure 8:
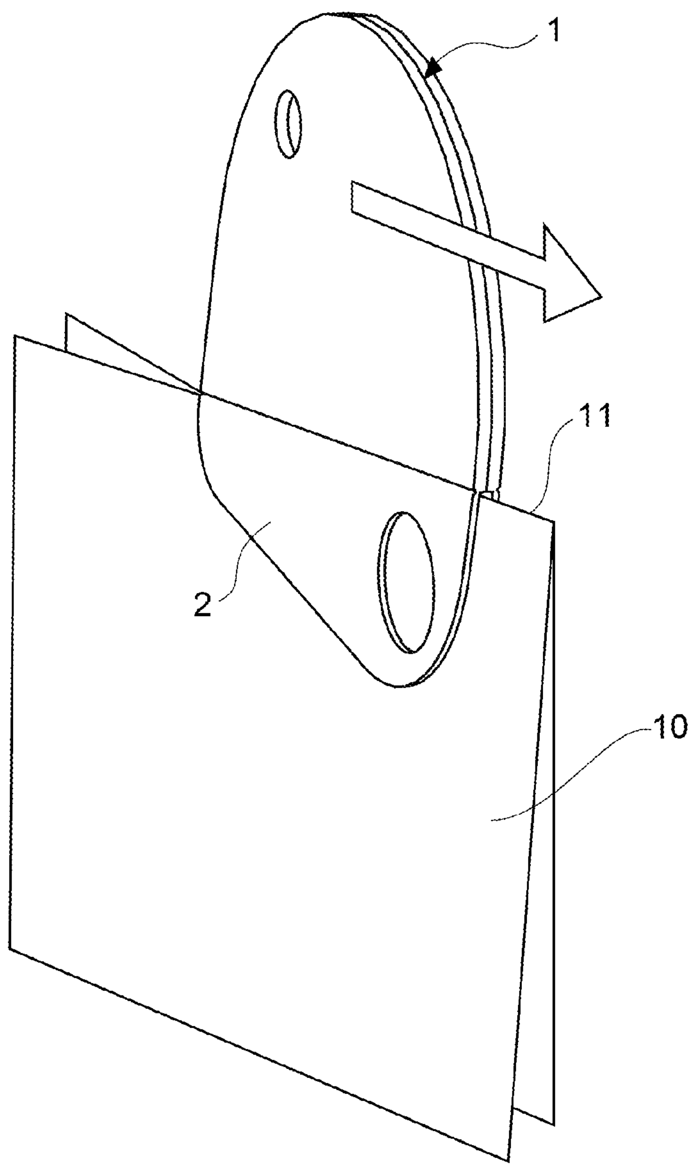
FIG. 8 is yet another schematic view showing the cutting process according to the one embodiment.
Figure 9:
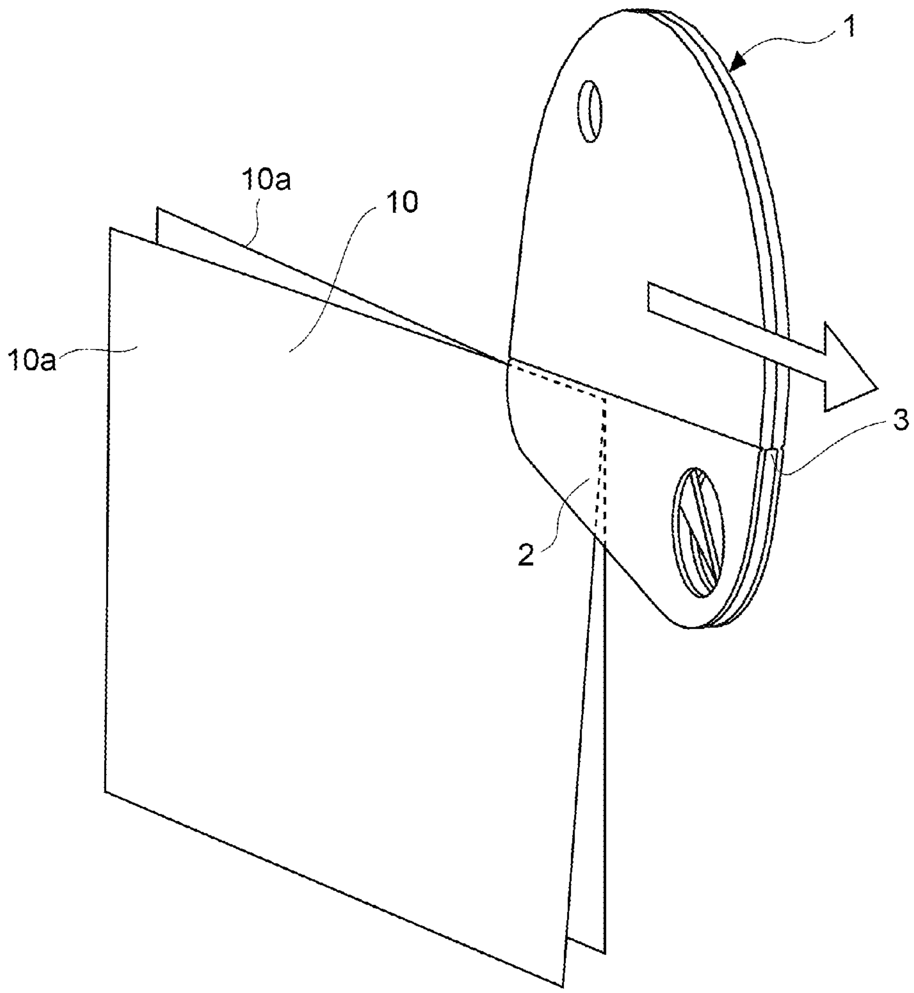
FIG. 9 is still another schematic view showing the cutting process according to the one embodiment.

Next, the main body 1 is moved along the crease direction (the arrow). Thus, the paper may be severed (FIG. 8, FIG. 9).

Although one embodiment of the present invention has been described, the present invention is not limited to the above one embodiment, and various changes and modifications may be made without departing from the scope and spirit of the invention.

For example, in the above one embodiment, the pair of cover pieces 2, 2 both moved to open or close, but at least one of them may be configured to open or close.

Also, in the embodiment, the cover pieces 2, 2 were biased in the opening or closing direction by forming the slit 4 to structure hinge parts, but the cover pieces 2, 2 may be configured to achieve a similar operation with the members' elasticity alone, without providing the slits. Further, the hinges may be configured with a physical or mechanical hinge mechanism instead of slits. In this case, the upper main body 1 and the cover piece 2 may be separate parts. Moreover, in order to bias in the close direction, a spring or the like may be attached to the hinge mechanism.

Also, the maximum open and close angle of the cover pieces 2, 2 was 90 degrees (45 degrees on each side relative to the cutter 6), but this maximum angle may be restricted to be 120 degrees, 60 degrees, or 30 degrees (60 degrees, 30 degrees, or 15 degrees on each side relative to the cutter 6). Further, the cover pieces 2, 2 in their open state are preferably configured to close on their own to their original state due to the hinge bias force (restoring force or spring force), in which case, for example, instead of restricting their opening angle as above, the cover pieces 2, 2 may be configured to open until they abut the main body surfaces, and the cover pieces 2, 2 and the main body may be detachably attached using a fastener such as a button or the like. Further, when the cover pieces 2 are closed, if a fastener means (indicated with 13 in FIG. 4) such as a snap button or the like (it may be a hook or the like) for closing the cover pieces 2 is provided at opposing positions on the cover pieces 2 for maintaining the closed state to prevent the cover pieces 2 from accidentally open, this fastener means may be engaged.

Further, the guide surface 5 was linear, but it may be a curved surface.

Also, in the above embodiment, the see-through holes 7 were provided in the cover pieces 2 for aligning the tip part 6*a* of the knife 6 and the paper, but these the see-through holes 7 are not necessary, for example, when the protective covers are made with transparent members. Moreover, even when the protective covers are not made with transparent members, the see-through holes 7 simply may not have to be provided.

Further, the profile of the cover pieces 2, 2 may be of any shape capable of covering the tip part 6*a* of the cutter 6 safely when the cover pieces 2, 2 are closed. Also, an angle of the cutter 6 is not limited to the above one embodiment, and the cutter 6 may be configured to protrude generally vertically from the guide surface 5.

Furthermore, the shape and/or material of the cutter is not limited to the above one embodiment, and may be, for example, made of a non-metallic material such as ceramic, plastic, wood, or the like. Moreover, in the above embodiment, the main body was configured to be divided into two parts, which sandwich and retain the cutter in between, but the cutter and the main body may be formed as one integral part (e.g., of ceramic, plastic, etc.) and only the tip part of the cutter may protrude from the guide surface.

Still further, the cutter tool of this invention is not limited to a cutter tool used as a letter opener, and may be used for, for example, opening a cardboard box, or the like. In that case, the cover pieces may be opened to an angle (e.g., 180 degrees and/or 90 degrees) so that they abut a surface or surfaces of a cardboard box.

DESCRIPTION OF THE REFERENCE NUMBERS

1. Main body
2. Cover pieces
3. Linear guide surface
4. Slit
5. Guide surface
6. Cutter
7. See-through holes
10. Paper
11. Cutting line (crease)

What is claimed is:

1. A cutter tool, comprising:

a main body defined by a guide surface formed on one end;

a cutter defined by a base end part attached to the main body and a tip part protruding from the guide surface; and a pair of cover pieces attached to the main body so that the cover pieces sandwich and hide the guide surface and the tip part of the cutter, wherein at least one of the cover pieces moves in a direction to close and a direction to open with respect to the cutter with the guide surface as a fulcrum, and exposes the tip part of the cutter by moving in the direction to open;

wherein the tip part of the cutter has a sharp tip, and the cutter is attached to the main body with an angle so that the tip protrudes more forwardly along a forward direction of the cutter than the base end part, and wherein the at least one of the cover pieces is provided with a see through hole for making the tip visible from outside while the cover pieces sandwich and hide the tip part of the cutter.

2. The cutter tool of claim 1, wherein a hinge part is provided between the at least one of the cover pieces and the main body for enabling open and close operations of the cover piece.

3. The cutter tool of claim 2, wherein the hinge part is configured to bias the at least one of the cover pieces in its closing direction.

4. The cutter tool of claim 2, wherein the cover piece and the main body are structured as one integral part, and the hinge is formed by providing a slit on a boundary line between the cover piece and the main body.

5. The cutter tool of claim 4, wherein the slit is provided in parallel with the guide surface.

6. The cutter tool of claim 1, wherein the main body is configured of two or more parts separable in a direction of sandwiching the cutter, and the two or more parts are joined together with the base end part of the cutter sandwiched there-in-between to thereby retain the base end part of the cutter protruding from the guide surface.

7. The cutter tool of claim 1, wherein the guide surface of the main body is for guiding a top crease line of paper.

8. The cutter tool of claim 1, wherein an open angle of the at least one of the cover pieces is restricted to be 90 degrees or less from the cutter as a reference.

9. The cutter tool of claim 1, wherein the open angle of the at least one of the cover pieces is restricted to be 60 degrees or less from the cutter as a reference.

10. The cutter tool of claim 1, wherein the open angle of the at least one of the cover pieces is restricted to be 45 degrees or less from the cutter as a reference.

11. The cutter tool of claim 1, wherein the pair of cover pieces comprise a fastener means for detachably attaching the cover pieces together to keep them in their closing state and prevent them from opening.

* * * * *